United States Patent
Berkovich et al.

(10) Patent No.: US 8,467,598 B2
(45) Date of Patent: Jun. 18, 2013

(54) UNCONSTRAINED SPATIALLY ALIGNED HEAD-UP DISPLAY

(75) Inventors: Erez Berkovich, Kiryat Bialik (IL); Gad Lifschuetz, Yuvalim (IL)

(73) Assignee: Rafael Advanced Defense Systems Ltd, Haifa (IL)

( * ) Notice: Subject to any disclaimer, the term of this patent is extended or adjusted under 35 U.S.C. 154(b) by 361 days.

(21) Appl. No.: 12/862,789

(22) Filed: Aug. 25, 2010

(65) Prior Publication Data

US 2011/0052009 A1    Mar. 3, 2011

(30) Foreign Application Priority Data

Aug. 27, 2009   (IL) ........................................... 20627

(51) Int. Cl.
*G06K 9/00*          (2006.01)
(52) U.S. Cl.
USPC ............................ 382/154; 345/427; 382/275
(58) Field of Classification Search
USPC .......................................... 382/154, 115, 103
See application file for complete search history.

(56) References Cited

U.S. PATENT DOCUMENTS

| 5,298,732 A | 3/1994 | Chen |
| 6,750,832 B1 * | 6/2004 | Kleinschmidt .................... 345/7 |
| 2005/0232509 A1 * | 10/2005 | Blake et al. .................... 382/275 |
| 2007/0262971 A1 | 11/2007 | Hahn |

FOREIGN PATENT DOCUMENTS

| DE | 10131720 | 1/2003 |
| DE | 102004040538 | 3/2005 |
| DE | 102005003181 | 7/2006 |
| DE | 102005030968 | 1/2007 |
| DE | 102005058018 | 6/2007 |
| DE | 102007001266 | 7/2008 |
| DE | 102007025531 | 12/2008 |

* cited by examiner

*Primary Examiner* — Hadi Akhavannik
(74) *Attorney, Agent, or Firm* — Mark M Friedman

(57) ABSTRACT

A system for providing a spatially aligned head-up display to a user viewing a scene through a display the system includes: an image sensing system including at least one image sensor deployed to sample images of the user's face, the image sensing system generating data derived at least in part from the images; a display for displaying visible indications to the user superimposed on the scene; and a control system associated with the image sensing system and the display, the control system being configured to: process data from the image sensing system to determine a position and attitude of the user's face, determine a viewing direction from at least one eye of the user to a point of interest within the scene, and actuate the display to display a visible indication aligned with the viewing direction that provides a spatially aligned head-up display to the user.

8 Claims, 15 Drawing Sheets

UNCONSTRAINED SPATIALLY ALIGNED HEAD-UP DISPLAY

FIELD AND BACKGROUND OF THE INVENTION

The present invention relates to head-up displays and, in particular, it concerns a head-up display spatially aligned with the real world for a user viewing a scene through a window.

In the field of military aeronautics, it is known to provide a pilot with a head-up display (HUD). A HUD is a transparent display through which the pilot can see the real world, but which can at the same time present to him additional information, visually superimposed on the real scene. The HUD may be a cockpit-mounted device, in which case it typically covers a limited forward-looking field of view, or may be helmet mounted, in which case it is referred to as a helmet-mounted display (HMD).

In certain cases, a simple HUD system may only display data, such as the state of various aircraft instrumentation, and the location of the data in the field of view is not critical. Of more relevance to the present invention, are spatially aligned HUDs in which the display provides various symbols or other information spatially aligned to appear superimposed over, or otherwise aligned with, a corresponding object or point of interest in the scene viewed by the pilot. This allows the system to prompt the user to look in a specific direction, for example, to identify an incoming target at the limit of the visual range, or to specify what object is being tracked by a weapon system.

Implementation of a spatially aligned HUD is typically highly complex for two reasons. Firstly, complex hardware is used to measure the exact position and pose of the user's head in order to determine the alignment of the HUD with the real world as viewed by the user. Head position is typically measured by tracking the position of the user's helmet within the cockpit, either by a magnetic tracking system or by optical tracking of markers affixed to the helmet. Prior calibration procedures are required in order to determine the position of the user's eyes from the helmet tracking data.

A second reason for the complexity of HUD systems is the use of collimated optics in the display itself. In order for the content of the display to appear in focus while the user is looking at a distant scene, aircraft HUD or HMD systems typically employ an optical arrangement that makes the displayed information and symbols appear to be at infinity, known as collimated optics. This adds significantly to the complexity and weight of the display, and typically limits the available range of viewing angles. Each HUD typically can only be used by a single person at a time, requiring replication of the entire system for each user of the system.

Due to this complexity, and the accompanying costs, use of the HUD has generally been limited to military aircraft and to high-end augmented reality systems. Furthermore, the reliance on a helmet as part of the head tracking system inhibits adoption of HUD technology for various other applications.

Parenthetically, it should be noted that the literature contains many references to head-up displays in the context of automobile instrumentation. However, these HUD systems are typically not spatially aligned displays, as defined above. Techniques such as U.S. Pat. No. 6,750,832 to Peter Kleinschmidt for Information display system for at least one person teach image processing for face detection and gaze direction approximation in a vehicle. This technique teaches deflecting an illumination beam path into the field of view of the observer to display vehicle information, or information requested by the user through a user operated input device. Publication number US 2007-0262971 A1 to Stefan Hahn, Ulm, (DE) for Method and Device for Operating an Optical Display Device teaches a technique for identifying the general direction of a driver's view and varying the display of vehicle information to be compatible with this view. As previously stated, these HUD systems are not spatially aligned displays, as defined above.

There is therefore a need for a spatially aligned head-up display that is a simpler, lower-cost solution that can be used with multiple users. It is desirable that users not be constrained by equipment (such as helmets) and that it is not necessary to require the user to calibrate himself to the system prior to use.

SUMMARY OF THE INVENTION

According to the teachings of the present embodiment there is provided, a system for providing a spatially aligned head-up display to a user viewing a scene through a display the system including: an image sensing system including at least one image sensor deployed to sample images of the user's face, the image sensing system generating data derived at least in part from the images; a display for displaying visible indications to the user superimposed on the scene; and a control system associated with the image sensing system and the display, the control system including at least one processor, the control system being configured to: process data from the image sensing system to determine a position and attitude of the user's face, determine a viewing direction from at least one eye of the user to a point of interest within the scene, and actuate the display to display a visible indication aligned with the viewing direction that provides a spatially aligned head-up display to the user.

In an optional implementation, the control system is configured to process the data to derive a three-dimensional model of at least a part of the face of the user, the three-dimensional model being used in determining the position and attitude of the user's face. In another optional implementation, the image sensing system includes at least two of the image sensors deployed to sample images of the user's face from differing viewpoints to generate stereo image pairs, and wherein the three-dimensional model of at least part of the face of the user is derived at least in part from the stereo image pairs. In another optional implementation, the three-dimensional model of at least part of the face of the user is derived at least in part from images sequentially sampled from a single image sensor. In another optional implementation, the three-dimensional model of at least part of the face of the user is derived at least in part by co-processing at least one sampled image with a pre-defined template of facial features. In another optional implementation, the image sensor is a depth-sensing image sensor. In another optional implementation, the three-dimensional model of at least a part of the face of the user is stored in the control system and wherein the control system is configured to use the stored three-dimensional model of at least a part of the face of the user in determining the position and attitude of the user's face. In another optional implementation, the display is a non-collimated display associated with a surface of a window.

In another optional implementation, the visible indication includes a first visible indication portion displayed in a first position aligned with the viewing direction from a first eye of the user to the point of interest in the scene and a second visible indication portion displayed in a second position aligned with the viewing direction from a second eye of the user to the point of interest in the scene such that the first visible indication portion and the second visible indication portion combine in the perceived view of the user to indicate the point of interest. In another optional implementation, the control system is configured to process the data to determine a position and attitude of a plurality of faces, and to actuate the display to display visible indications in a corresponding plurality of positions relative to the window, each of the visible indications being aligned with the viewing direction for a corresponding one of the faces.

In another optional implementation, the control system is configured to vary dynamically a number of visible indications displayed according to a number of faces currently detected.

In an optional implementation, the system is associated with a terrestrial vehicle and the display is associated with a window of the vehicle, the system further including: a geo-positioning device associated with the control system and deployed for tracking a geographical position of the vehicle; and a geographical database operationally connected to the control system and containing location information for a plurality of points of interest. In another optional implementation, the control system is further configured to employ data from the geo-positioning device and from the geographical database to determine, based on the current position and attitude of the user's face, a subset of the points of interest currently visible to the user.

In an optional implementation, the system additionally includes a shading system and the control system is additionally configured to determine the line of sight from a user's face to a radiation point, and actuate the shading system to provide shade aligned with the line of sight. In an optional implementation, the control system is additionally configured to determine a line of sight from a user's face to a radiation point, and actuate the display system to provide shade aligned with the line of sight.

In an optional implementation, the system is additionally configured to vary dynamically a visible indication on a single non-collimated display, the display providing a spatially aligned head-up display, such that a user looking binocularly through the display at an object of interest perceives a visible indicator that indicates the object of interest, the method including the steps of: calculating the user's apparent binocular displacement on the display relative to the object of interest; and varying dynamically, based on the apparent binocular displacement, the width of the visible indication.

According to the teachings of the present embodiment there is provided, a method for providing a spatially aligned head-up display to a user viewing a scene through a display, the method including the steps of sampling images of the user's face; processing the images to determine a position and attitude of the user's face; determining a viewing direction from at least one eye of the user to a point of interest within the scene; and displaying on a display a visible indication aligned with the viewing direction that provides a spatially aligned head-up display to the user.

In an optional implementation, the processing derives a three-dimensional model of at least a part of the face of the user, the three-dimensional model being used in determining the position and attitude of the user's face. In another optional implementation, the three-dimensional model of at least a part of the face of the user is stored and the stored three-dimensional model of at least a part of the face of the user is used in determining the position and attitude of the user's face. In another optional implementation, the display is a non-collimated display associated with a surface of a window.

In an optional implementation, the visible indication includes a first visible indication portion displayed in a first position aligned with the viewing direction from a first eye of the user to the point of interest in the scene and a second visible indication portion displayed in a second position aligned with the viewing direction from a second eye of the user to the point of interest in the scene such that the first visible indication portion and the second visible indication portion combine in the perceived view of the user to indicate the point of interest. In another optional implementation, the processing determines a position and attitude of a plurality of faces, and wherein the display displays visible indications in a corresponding plurality of positions relative to the window, each of the visible indications being aligned with the viewing direction for a corresponding one of the faces.

In an optional implementation, a number of visible indications displayed are varied dynamically according to a number of faces currently detected.

In another optional implementation, the display is associated with a window of a terrestrial vehicle, and wherein the determining a viewing direction includes the steps of tracking a geographical position of the vehicle; and retrieving from a geographical database location information for the point of interest. In an optional implementation, the method includes determining, based on the current position and attitude of the user's face, a subset of points of interest from the geographical database currently visible to the user.

In an optional implementation, a line of sight is determined from a user's face to a radiation point, and a shading system is actuated to provide shade aligned with the line of sight. In another optional implementation, a line of sight is determined from a user's face to a radiation point, and the display system is actuated to provide shade aligned with the line of sight. In an optional implementation, the method further includes varying dynamically a visible indication on a single non-collimated display, the display providing a spatially aligned head-up display, such that a user looking binocularly through the display at an object of interest perceives a visible indicator that indicates the object of interest, the method including the steps of: calculating the user's apparent binocular displacement on the display relative to the object of interest; and varying dynamically, based on the apparent binocular displacement, the width of the visible indication.

According to the teachings of the present embodiment there is provided, a method for employing a non-collimated transparent display to designate an object viewed by a user binocularly through the display, the method including: displaying a first visible indication portion in a first position on the display, the first position being aligned between a first eye of the user and the object; and displaying a second visible indication portion in a second position on the display, the second position being aligned between a second eye of the user and the object.

According to the teachings of the present embodiment there is provided, a system for providing a spatially aligned head-up display, the system including: a detection system for determining a position and attitude of each face of a plurality of users; a common display for displaying visible indications to the plurality of users viewing scenes through the common display; and a control system associated with the detection system and the common display, the control system including at least one processor, the control system being configured to: process data from the detection system to determine a position and attitude of each of the user's faces, determine a viewing direction from at least one eye of each of the users to an associated point of interest within a corresponding scene, and actuate the common display to display a visible indication aligned with each of the viewing directions that provides a spatially aligned head-up display to the users. In an optional implementation, the common display is a non-collimated display associated with a surface of a window. In another optional implementation, the control system is configured to vary dynamically a number of visible indications displayed according to a number of faces currently detected. In another optional implementation, the control system is configured to actuate a plurality of displays, wherein each of the displays provides a spatially aligned head-up display to one or more users.

According to the teachings of the present embodiment there is provided, a method for providing a spatially aligned head-up display, the method including the steps of: determining a position and attitude of each face of a plurality of users; determining a viewing direction from at least one eye of each of the users to an associated point of interest within a corresponding scene; and displaying on a common display a visible indication aligned with each of the viewing directions, which provides a spatially aligned head-up display to the users. In an optional implementation, the common display is a non-collimated display associated with a surface of a window. In another optional implementation, the control system is configured to vary dynamically a number of visible indications displayed according to a number of faces currently detected. In another optional implementation, the control system is configured to actuate a plurality of displays, wherein each of the displays provides a spatially aligned head-up display to one or more users.

According to the teachings of the present embodiment there is provided, a method for varying dynamically a visible indication on a single non-collimated display, the display providing a spatially aligned head-up display, such that a user looking binocularly through the display at an object of interest perceives a visible indicator that indicates the object of interest, the method including the steps of: calculating the user's apparent binocular displacement on the display relative to the object of interest; and varying dynamically, based on the apparent binocular displacement, the width of the visible indication.

In an optional implementation, the height of the visible indication is varied dynamically based at least on a distance from the user to the object of interest such that the perceived height of the visible indicator relative to the object of interest is substantially maintained. In an optional implementation, the height of the visible indication is varied dynamically based on at least a distance from the user to the display such that the perceived height of the visible indicator relative to the user is substantially maintained. In an optional implementation, the visible indication is displayed such that, in the user's perceived binocular view, the object of interest is framed by the visible indicator. In an optional implementation, the visible indication is displayed such that in the user's perceived view a proportion of horizontal overlap of the visible indication with itself due to the apparent binocular displacement is maintained substantially constant. In an optional implementation, the visible indication includes a first visible indication portion displayed in a first position aligned with the viewing direction from a first eye of the user to the point of interest in the scene and a second visible indication portion displayed in a second position aligned with the viewing direction from a second eye of the user to the point of interest in the scene such that the first visible indication portion and the second visible indication portion combine in the perceived view of the user to indicate the point of interest.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
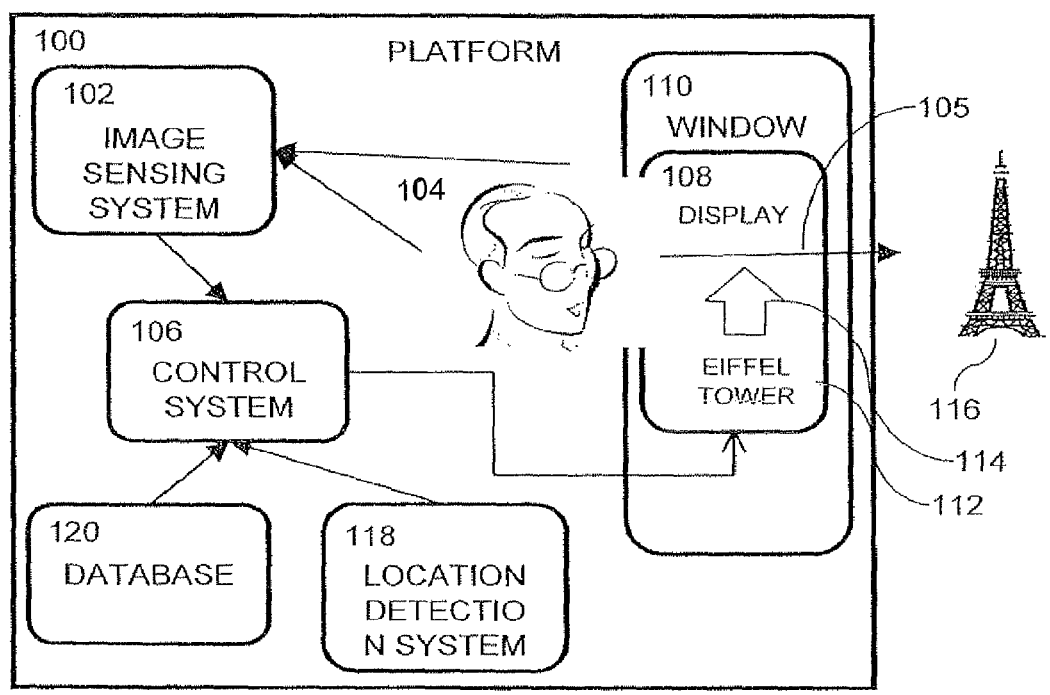
FIG. 1 is a diagram of a system for providing a head-up display spatially aligned with the real world for a user viewing a scene through a display.

The principles and operation of the system according to the present invention may be better understood with reference to the drawings and the accompanying description. Referring now to the drawings, FIG. 1 is a diagram of a system for providing a head-up display spatially aligned with the real world for a user viewing a scene through a display. The system includes a platform 100 that is the area of implementation for the system. An image sensing system 102 to sample images of a user's face 104 is operationally connected to a control system 106 that is operationally connected to a display 108. The display 108 is associated with a window 110 and displays visible indications such as 112, 114 to the user superimposed on a scene such as 116. Optionally, the control system is operationally connected to a location detection system 118 and a database 120.

In FIG. 1, the system is shown implemented on a platform 100. The term platform refers to the area of implementation, and depends on the specific application of the system. Mobile platform implementations are possible such as a tour bus, train, cable-car, or personal vehicle Stationary platform implementations are also possible, such as a picture window exposing stationary points of interest, such as a cityscape, or exposing mobile points of interest, such as a sports game or animals in a zoo. A variety of physical configurations is possible for the system components. In the example of a mobile platform, it may be preferable to implement the system components on the platform. In the example of a stationary platform, it is possible to implement the system components in diverse locations. Other options and combinations will be obvious to skilled in the art.

An image sensing system 102 includes at least one image sensor deployed to sample images of the user's face 104. The image sensing system generates data derived at least in part from the images of the user's face. The image sensing system is operationally connected to a control system 106.

The control system 106 contains at least one processor, and is configured to provide processing for the system. The control system processes the data from the image sensing system 102 to determine a position and attitude of the user's face 104. Next, the control system determines a viewing direction 105 from at least one eye of the user to a point of interest within the scene 116. The control system uses the viewing direction to actuate the display 108 to display a visible indication 112, 114 aligned with the viewing direction. The display displays visible indications to the user superimposed on the scene.

In an optional implementation, the control system 106 processes the data from the image sensing system 102 to derive a three-dimensional model of the surface of at least part of the face of a user. The three-dimensional model is then used to determine the position and attitude of the user's face. Note that the specific location of this processing depends on the application of the system. Optionally the image sensing system 102 can derive a three-dimensional model of at least part of the face of the user and provide the model to the control system 106. Similarly, the specific location where other system processing is implemented can vary and depends on the application of the system. Other options will be obvious to one skilled in the art.

Figure 8A:
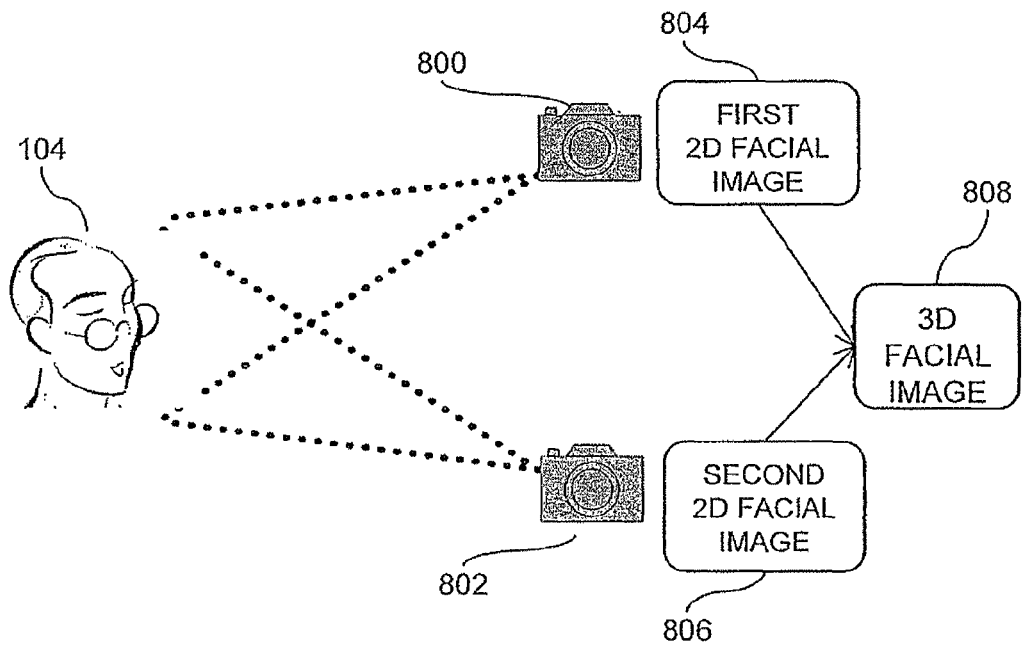
FIG. 8A is an illustration of an image sensing system including at least two image sensors.

Referring to FIG. 8A is an illustration of an image sensing system including at least two image sensors. In an optional implementation, the image sensing system includes at least two image sensors 800, 802. Each of the two image sensors provides a sampled image of the face of the user 104 from differing viewpoints to generate stereo image pairs 804, 806. One example of an image sensor is a camera that samples still images. Another example is a video camera that samples a series of images, from which an image can be selected to use in this implementation. Each of the two cameras samples an image from a different position to provide a stereo image pair. The stereo image pair can be used to generate a three-dimensional model of at least part of the face of the user 808.

In another optional implementation, a single image sensor can be used to provide sequentially sampled images of the face of the user and the sequential images used to generate a three-dimensional model of at least part of the face of the user. One example of an image sensor that provides sequentially sampled images is a video camera. Known techniques, such as structure from motion (SFM), can be used with the sequentially sampled images to construct the three-dimensional model of at least part of the face of the user. In an implementation using two cameras, this technique can be useful when the view of one of the cameras is obscured and only one camera is available to provide an image of the viewer.

Figure 8B:
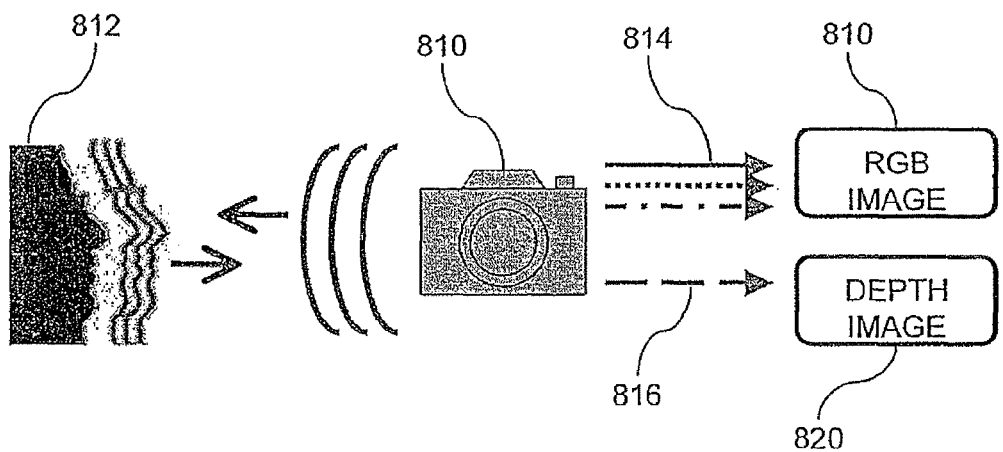
FIG. 8B is an illustration of using a depth-sensing device to generate a three-dimensional model of at least part of the face of the user.

Referring to FIG. 8B is an illustration of using a depth-sensing device to generate a three-dimensional model of at least part of the face of the user. In another optional implementation, the image sensor is a depth-sensing device 810. Depth-sensors generate distance (depth) information for each pixel or object captured by the device. The depth sensor 810 captures information about the user 812. Depending on the specific application, this information can include the RGB values 814 and depth values 816 that are used to produce an RGB image 818 and a depth image 820. Depending on the specific device used, these images and information may be used directly or may need processing to generate a three-dimensional model of at least part of the face of the user.

Figure 9A:
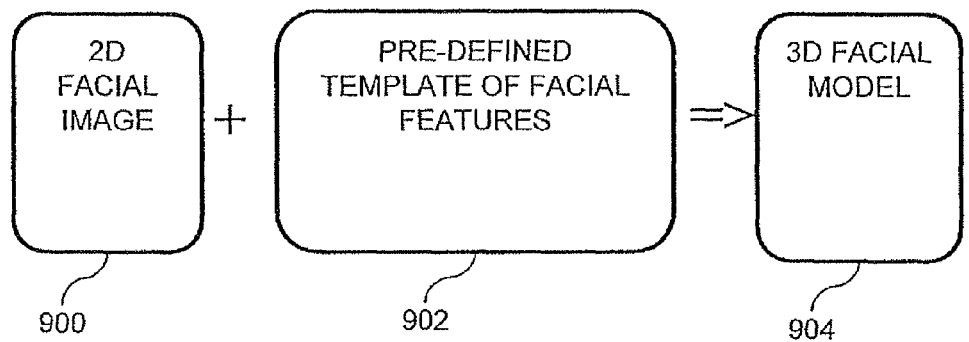
FIG. 9A is a flowchart of processing a two-dimensional image with a single reference model to generate a three-dimensional model of at least part of the face of the user.

Referring to FIG. 9A is a flowchart of processing a two-dimensional image with a single reference model to generate a three-dimensional model of at least part of the face of the user. In an optional implementation, the image sensor is a single image capture device that is used to sample a two-dimensional image of a user. The image is processed to find the area of the image containing the face. This input image of a two-dimensional facial image 900 of the user is processed with a single reference model 902 using a pre-defined template of facial features to generate an output image that is a three-dimensional model of at least part of the face of the user 904. Techniques for performing this processing are known in the industry.

Figure 9B:
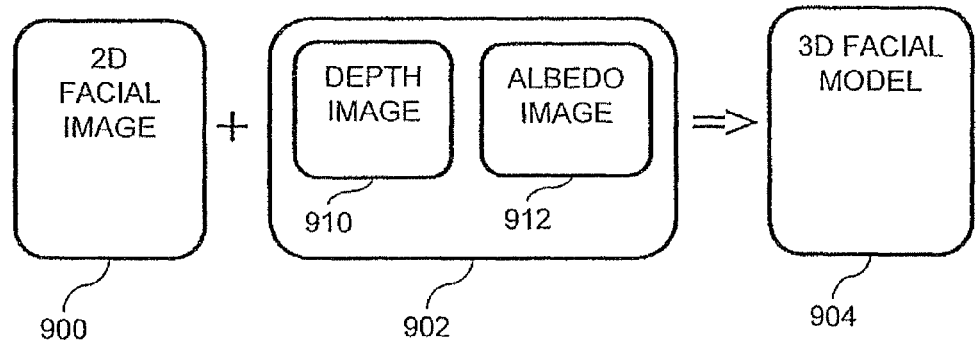
FIG. 9B is a flowchart of an example of processing a two-dimensional image with a single reference model to generate a three-dimensional model of at least part of the face of the user.

Referring to FIG. 9B is a flowchart of an example of processing a two-dimensional image with a single reference model to generate a three-dimensional model of at least part of the face of the user. A two-dimensional facial image 900 of the user is processed with a pre-defined template of facial features 902 that includes a depth image 910 and an albedo image 912 to generate an output image that is a three-dimensional model of at least part of the face of the user 904.

In another optional implementation, the three-dimensional model of at least part of the face of the user is stored in the system. In this implementation, it is not necessary to regenerate the three-dimensional model for every update. Instead, information from the image sensing system is used to determine the location and orientation of the face of the viewer, which is then used with the three-dimensional model for further processing. This implementation results in less time required for processing and reducing processing capability requirements. As the users of the system move, the image sensing system samples subsequent images of the users. The specific amount of time between samples is determined by the specific application of the system. Subsequent samples and the corresponding three-dimensional model of at least part of the face of the user are used to track the position and attitude of the user's face.

In an optional implementation, the display 108 is a non-collimated display associated with a surface of a window 110. In this context display is a transparent device that allows the user to view a scene on the opposite side of the display. The surface of the window that the user is looking through may be associated with the display in a variety of ways. In one implementation, the display is embedded in the window. In another implementation, the display is attached to the window. In another implementation, the display is juxtaposed in a spaced relation to the window. In another implementation, the visible indicator is projected onto the surface of the window. Transparent displays are known in the industry, such as the Transparent EL see-through electroluminescent display by Planar Systems, or the TOLED transparent and top-emitting OLED technology by Universal Display Corporation. Other techniques and technologies, such as semi-transparent glasses, are known in the art. In this description, the area where the visible indicator is displayed is referred to as the display.

Using the position and attitude of the user's face the control system determines a line of sight from at least one eye of the user 105, or in other words, where are the person's eyes and where are the eyes looking. Position refers to the three-dimensional location of the user's face relative to a given reference. Attitude refers to the orientation of the user's eyes relative to a given reference. The given references can be the same, or they can be different as long as their orientation to each other is known. Depending on the specific application of the method, possible references are the horizon, a given point on the user's platform, a given point on a window, or an arbitrary reference point selected to simplify processing. Line of sight can also be thought of as the gaze direction of the user. A vector from at least one eye of the user toward the point of interest 116 is referred to as the viewing direction. Note that if the user is looking at a point of interest, then the line of sight and the viewing direction are the same vector. If the user is not looking at a point of interest, then the line of sight and the viewing direction are different vectors. The control system uses the viewing direction to calculate where the view of the user intercepts the display. In other words, what location on the display are the eyes of the user looking through when the user is looking at a point of interest in a scene on the other side of the window? This location on the display corresponds to a location on the associated window and the location is referred to as a visible indication position.

Using the viewing direction and the visible indication location, the control system calculates how a visible indicator needs to be displayed. In one implementation, two visible indication portions are used, each portion associated with one eye of the user, to provide a visible indicator for a point of interest. A first visible indication portion is displayed in a first position of the display, aligned with the viewing direction from a first eye of the user to the point of interest in the scene. A second visible indication portion is displayed in a second position of the display aligned with the viewing direction from a second eye of the user to the point of interest in the scene. As a user looks through the window, and hence through the display and through the two visible indicator portions, the two visible indicator portions combine in the perceived view of the user to produce a visible indicator for the point of interest.

The location as well as the size and shape of the visible indicator need to be calculated. According to a non-limiting example, if the user is further away or closer to the window, the visible indicator will need to be scaled relatively larger or smaller and positioned closer together or further apart to adequately indicate the point of interest on the other side of the window. According to another non-limiting example, if the user is looking through the window at a given angle in reference to the window, the visible indicator will need to be skewed (adjusted and slanted) to take this angle into account and properly display the visible indicator. According to another non-limiting example, if the tilt of the user's head changes, and hence the tilt of the user's eyes changes in association with a reference, such as horizontal, the location of the visible indicator will need to be adjusted accordingly. Note that in a case where only one eye of the user has a viewing direction to the point of interest, the system calculates a visible indication location on the display and a visible indication portion corresponding to the one eye.

Note that the previous system description is not limited to a single user. In an optional implementation, the control system is configured to determine a position and attitude of a plurality of faces. The control system determines the viewing direction for each of the plurality of faces, calculates the corresponding visible indication location for the eyes of each of the plurality of faces, then calculates and displays the appropriate visible indication portion in a corresponding plurality of positions relative to the window, each of the visible indication portions being aligned with the viewing direction for a corresponding one of the faces.

In an optional implementation, a number of a faces are initially detected by the system and a corresponding number of visible indications are displayed. In subsequent processing, the number of detected faces varies. The control system is configured to vary dynamically the number of visible indications displayed according to the number of faces currently detected. This detection is performed on a given region. Faces detected within the relevant region are processed, and the corresponding visible indicators displayed for the faces in the relevant region. Faces outside the relevant region are not processed. An example of this implementation is tourists walking by a picture window with a view of a scene. An area in front of the picture window is designated as the relevant region, for instance an area that is close enough to the picture window for tourists to see out of the window and view points of interest. As the tourists move within the designated area in front of the picture window, the system detects the face of the tourists, performs the above described processing, and displays the appropriate visible indicators on the window.

In an optional implementation, the system is associated with a terrestrial vehicle and the display is associated with a window of the vehicle. An example is the case where the platform is a bus. Referring again to FIG. 1, a location detection system 118, or geo-positioning device, provides information on the geographical position of the platform, and hence the location of the user relative to the scene of the world around the user. In one implementation, the location detection system is a global positioning system (GPS) based system. In another implementation, the location detection system can include an image sensor and processing to correlate a sampled image of a scene with known images and positions of scenes. In another implementation, the texture of the surrounding scene can be captured and correlated with images from a geographical database in conjunction with a digital terrain map (DTM) to determine the location of the platform. In another implementation, the location can be provided to the system by another entity. An example is the case where a tour guide manually enters location information into the system. The control system accesses a database of geographical information 120 and uses the location information to determine the points of interest in the scene associated with the location. In another implementation, the points of interest are provided by another entity. An example is the case where a tour guide manually designates a point of interest in a scene. Note that other vehicle implementations are possible, such as amphibious platforms (for example a boat or submarine) or airborne vehicles, (for example a plane or dirigible).

In an optional implementation, the control system uses the position and attitude of the user's eyes (the viewing direction) in combination with location information from the location detection system and the corresponding points of interest in the scene from the database to determine what subset of the points of interest are currently visible to the user. The system then displays a visible indication aligned with at least one of the subset of points of interest.

Depending on the system configuration and database content, a variety of display options is available. The database can contain information such as the name of a point of interest in a scene 112. Optionally the database can contain other information, including which points of interest are in a scene, and information about points of interest, such as dates or descriptions. In one implementation of the system, a user can select and/or configure what the user wants displayed. Selection can include turning the display on and off, adjusting display times, such as how long the visible indication is displayed for, or what type of visible indicators the user does or does not want displayed. One example of determining how to display the information is checking the applicable user preferences (configuration settings) to see if a specific user wants their attention to points of interest in a scene indicated by an arrow shape pointing at the point of interest 144, or if the user prefers the point of interest to be indicated by having a circle displayed around the point of interest. Optionally in addition or in place of visual information, the database can contain audio information. Depending on the specific application of the system and user preferences, the user can be provided with audio or other information and/or stimulation. An example is a point of interest having an associated audio description. When a user views the point of interest, a verbal description is sent to the user's headphones. Other options will be obvious to one skilled in the art.

Note that if the system determines that the user is not looking at a scene, the system does not have to do any display processing, rather the system tracks the user to determine the user viewing direction. When it is determined that the user is looking at a scene, the system then can access the database and provide visible indicators. An example of this case is a user turning away from the window of her tour bus to talk to the person sitting next to her. After selecting what information is to be displayed, the control system determines what visible indicator to use and displays as previously described.

Figure 12:
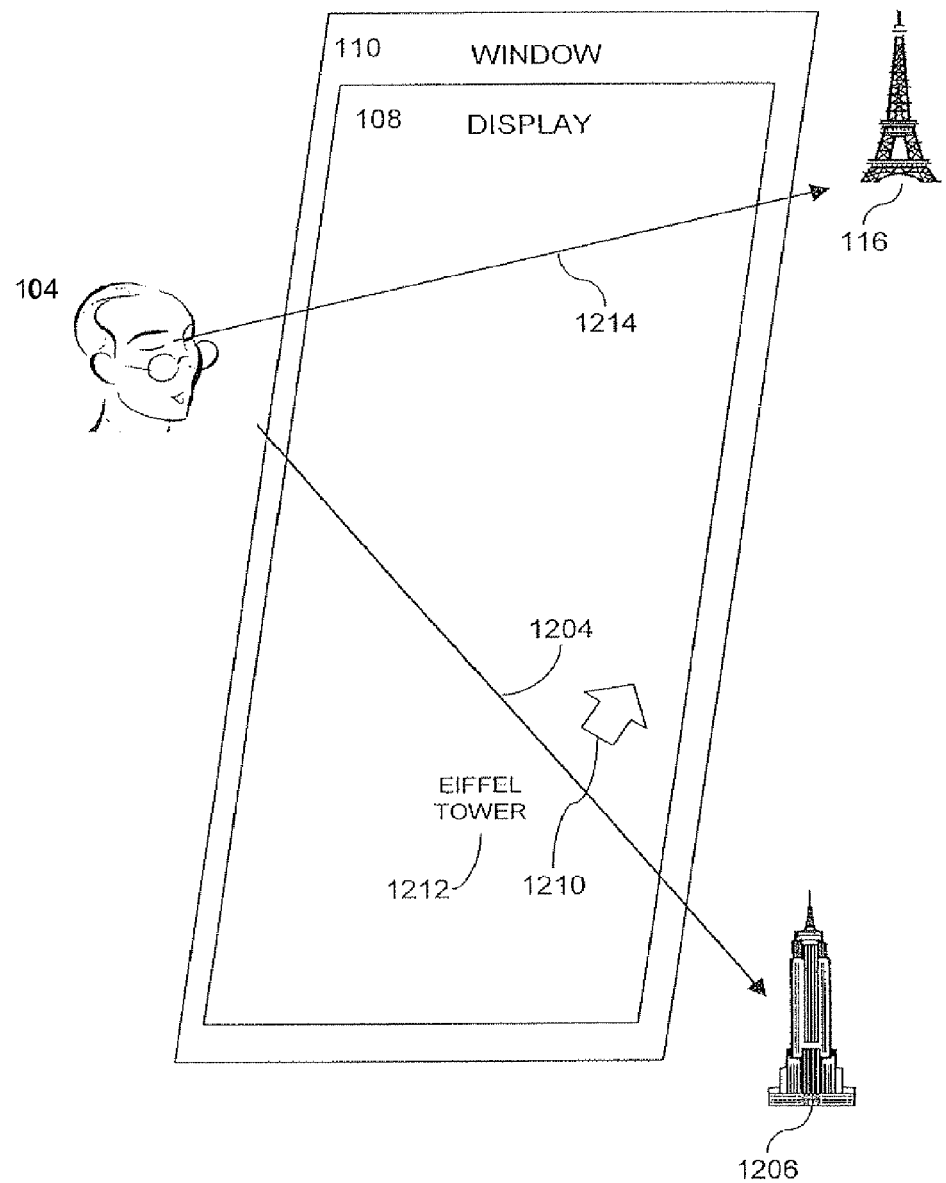
FIG. 12 is an illustration of displaying a visible indication to direct a user's attention to a point of interest.

Referring to FIG. 12, this is an illustration of displaying a visible indication to direct a user's attention to a point of interest that is not in the current view of the user. In an optional implementation, the control system is configured to display a visible indication aligned with the current line of sight of the user, such that the visible indication directs the user's attention to a new line of sight that is associated with a point of interest. A user 104 is looking through a display 108 and the associated window 110 along a current line of sight 1204 at a scene 1206. The system determines that there is a point of interest 116 and displays a visible indication 1210 to direct the user's attention to a new line of sight 1214. Optionally the system may display additional visible indications 1212 for the user, or provide audio to the user, or other indicators for the user. The system can optionally update the display to direct the user's attention to the current position of a point of interest or an object of interest. According to a non-limiting example, the platform that the user is on changes position, and the viewing direction necessary to view the point of interest changes. The system updates the visible indicator to direct the user's attention from the current line of sight to the new viewing direction. According to another non-limiting example the point of interest, or alternately the object of interest, is moving. This can happen when a user is viewing a scene through a picture window, such as at a zoo, and the object of interest is an animal that comes into the scene or is moving in the current scene. The system determines, or is provided, the position of the animal and the visible indication for the user is updated to direct the user's attention to the animal of interest.

In an optional implementation, the system includes a shading system. The system determines the line of sight from a user's face to a radiation point that the user needs to be shaded from, for example, the sun. This may be determined by the use of suitable photoelectric sensor arrangements or an imaging system, or by calculations based on the position and attitude of the platform and known data for the position of the sun. The position of the radiation point is used similarly to the position of a point of interest in a scene in the above-described method. The visible indication location is calculated to find where the line of sight from the user intercepts the shading system. Instead of the control system actuating a display to provide the user with a visible indication, the control system is configured to actuate the shading system to provide shade aligned with the line of sight. Shading systems are known in the art, for example U.S. Pat. No. 5,298,732 to Sweetsun Chen for Automatic visor for continuously repositioning a shading object to shade a designated location from a direct radiation source. In another implementation, the existing display system is used to provide the shading system. In this case, the display is activated in the area of the visible indication location to make the display opaque in that area, or described alternatively, activated to display an opaque visible indicator of sufficient size to provide shade to the user. The degree of opaqueness can be adjusted according to the specific application. It should be appreciated that the technique of this method can be used with a shading system or with the display, either together or separately.

The system can be used during the day, night, or under a variety of lighting conditions. In these cases, the appropriate image capture devices need to be used. One example is a night tour where the interior lights on the tour bus are dimmed. A near infrared (NIR) illumination source is used in conjunction with NIR cameras to capture images of the user's faces. This technique can also be used in a case where a user is wearing sunglasses or an image of the user's eyes can similarly not be captured in the visible spectrum. In this case, depending on the application of the system, a decision will need to be made of what points of interest are relevant to the user. In applications where external or outward facing cameras are being used, such as where cameras capture images of the surrounding scenes to derive location information or to identify points of interest, low light or no-light image capture devices can be used.

Optionally, a calibration phase is used to calibrate the system to a user. In one implementation, visible indications are displayed at known positions on the display. As the user looks at the visible indicators, the system captures images of the user's face and generates calibration information for the user, to be used during system operation to facilitate improved display of visible indicators.

Depending on the requirements of the specific implementation of the system, there can be issues such as the need to reduce delays for real-time processing. These issues can be addressed by using specific hardware and/or adding prediction algorithms to the system. The system can be used for both civilian and military applications.

Figure 2:
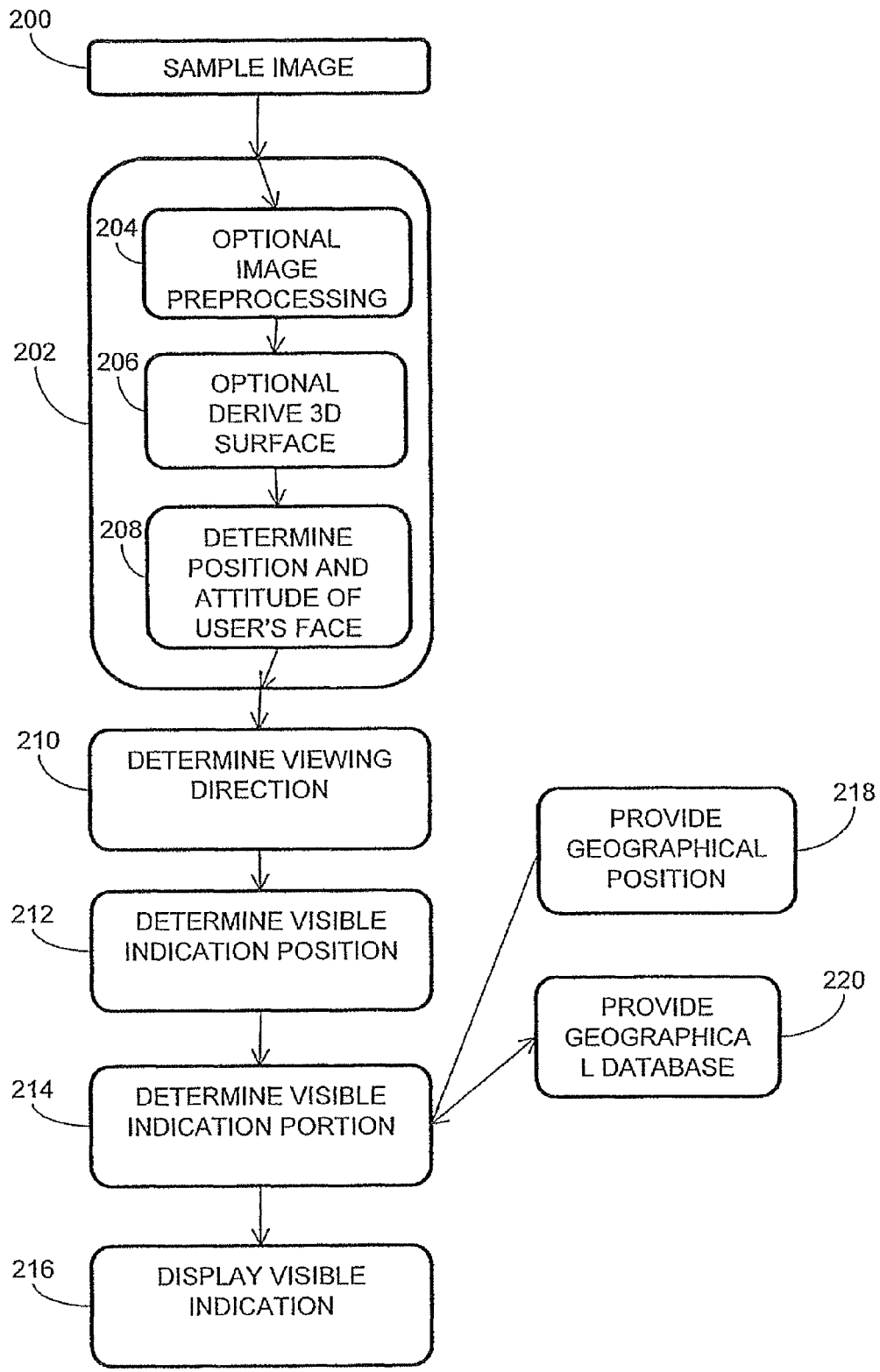
FIG. 2 is a flowchart of a method for providing a head-up display spatially aligned with the real world for a user viewing a scene through a display.

Referring now to the drawings, FIG. 2 is a flowchart of a method for providing a head-up display spatially aligned with the real world for a user viewing a scene through a display. The system includes sampling an image, shown in block 200. The sampled image includes the faces of at least one user. The image is processed as shown in block 202. Processing includes optional preprocessing, block 204, optionally deriving a three-dimensional model of at least a part of the face of the user, block 206, and determining the position and attitude of the user's face, block 208. The position and attitude of the user's face can be used to determine a viewing direction from at least one eye of the user to a point of interest within the scene, shown in block 210, and the viewing direction can then be used to determine the required visible indication location, shown in block 212. Next, the visible indication portion is determined, shown in block 214, and used to display a visible indication, shown in block 216. Optionally a geographical position can be provided, shown in block 218, and optionally a geographical database can be provided, shown in block 220 to determine the visible indication portion, as shown in block 214.

A sampled image is provided, block 200, for processing as shown in block 202. The image may require preprocessing, shown in block 204. Image preprocessing prepares the provided image for subsequent processing. Image preprocessing can include converting the image from the data format in which it is provided to a data format that can be processed by subsequent blocks and/or adjusting the color or content of the image.

Image preprocessing can also include determining the location in the image of one or more faces. In the context of this description, location refers to a two-dimensional reference and position refers to a three-dimensional reference. In a case where more than one face is located, each face can be processed according to this method. Techniques for locating faces in images are known in the art. Image preprocessing can also include normalization of the located faces. Normalization techniques facilitate processing the located faces. An example of the need for normalization is the case where the sampled image is acquired at a given distance. The located face is scaled to a standard size for subsequent processing. Techniques for performing normalization are known in the industry.

In an optional implementation the processing, block 202, includes deriving a three-dimensional model of at least a part of the face of the user, shown in block 206. This three-dimensional model is used by the next step, block 208 to determine the position and attitude of the user's face. In an optional implementation, the three-dimensional model is used with subsequently sampled images of the user's face to track the position and attitude of the user's face. The three-dimensional model may optionally be stored and used with subsequent sampled images to determine the (new) position and attitude of the user's face. In this case, the method does not need to derive the three-dimensional model every time a new sampled image is provided, rather the stored image can be used with the new sampled image to determine the new position and attitude of the user's face.

A given stored three-dimensional model can be used until it is no longer providing adequate results when determining the position and attitude of the user's face. Then a new three-dimensional model can be derived from an appropriate sampled image, for example the most recent sampled image. The specific parameters of how long a three-dimensional model can be used and when to derive a new one is determined by the application in which the method is used.

Using the position and attitude of the user's face a viewing direction is determined, in block 210, from at least one eye of the user to a point of interest within the scene. After determining the viewing direction, in block 210, the location on the display where the view of the user intercepts the display needs to be determined, shown in block 212, and referred to as the visible indication location. After determining the visible indication location, in block 212, it is necessary to determine what to display at the visible indication location, shown in block 214. What is displayed is referred to as the visible indicator portion. Displaying of the determined visible indicator portion is shown in block 216.

Figure 3A:
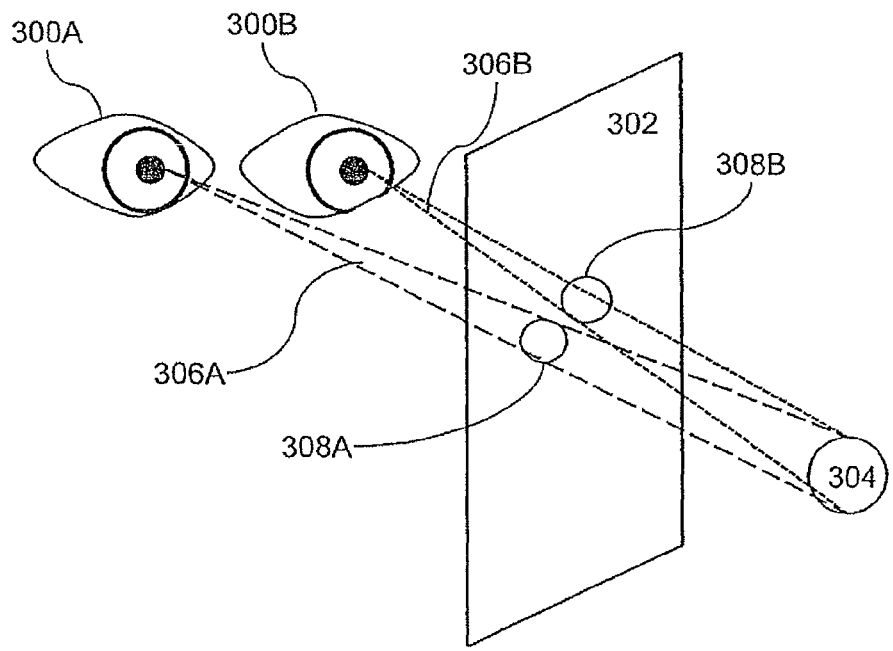
FIG. 3A is a diagram of a view of a user from the user's eyes through a display to a point of interest on the other side of the display.

Referring to FIG. 3A is a diagram of a view of a user from the user's eyes through a display to an object of interest on the other side of the display. In one implementation of this method, a display is associated with a window, so in that case the description of a view through the display is applicable to a view through the associated window. In an optional implementation, the display is a non-collimated display associated with a surface of the window.

Using both a right eye 300A and a left eye 300B a user looks through a display 302 at a point of interest 304. The viewing direction 306A from the right eye 300A intercepts the display in location 308A. Similarly, the viewing direction 306B from the left eye 300B intercepts the display in location 308B. FIG. 3A shows that when a user views a point of interest through a display, one technique for analyzing the viewing direction is that the viewing direction of each eye of the user intercepts the display in a different location. If a separate display is available for each eye, known techniques can be used to display visible indicators for one or both eyes, each on its own display aligned with a point of interest. In the case where the display is transparent, or if a window is substituted for the display, the user has a plain view of the point of interest.

Figure 3B:
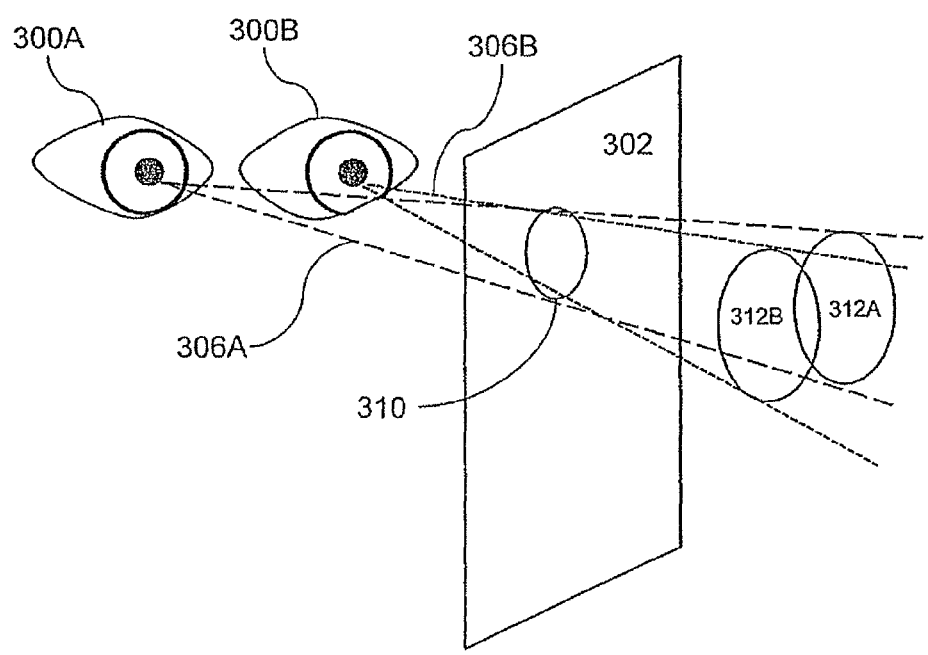
FIG. 3B is a diagram of a view from a user's eyes through a common area on a display to a point of interest on the other side of the display.

Referring to FIG. 3B is a diagram of a view from a user's eyes through a common area on a display to a point of interest on the other side of the display. One eye of a user, for example the right eye 300A, looks through a display 302 at a point of interest 312A. The location on the display where the viewing direction 306A of the right eye 300A, intercepts the display is 310. If the other eye of the user, for example the left eye 300B looks through the common area on the display 310, the viewing direction 306B of the left eye will be toward the point of interest 312B. This diagram shows that if both eyes look through the same common area on a display, the point of interest will be offset in the view of each eye. This technique of analyzing the viewing direction using a common area on a display is the technique used in the description below and in general the technique used in this description, unless explicitly stated otherwise.

Figure 4A:
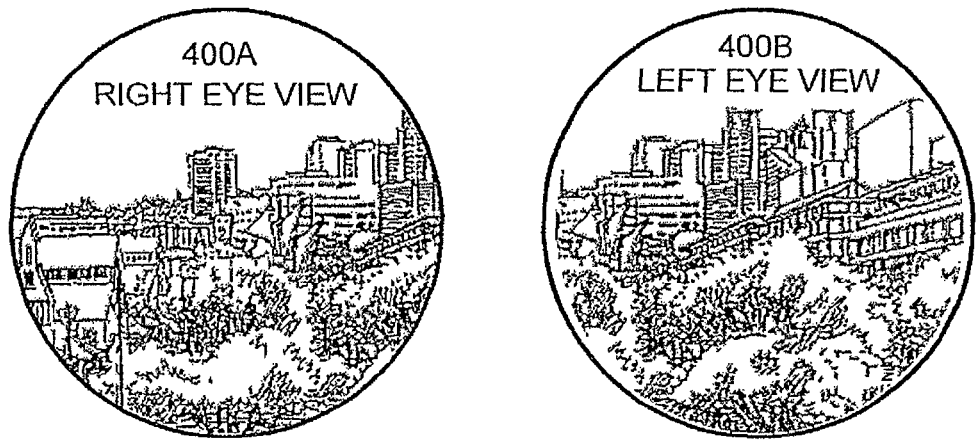
FIG. 4A is an illustration of the offset view seen by each eye of a user when looking through a common area on a display to a point of interest in the distance.
Figure 4B:
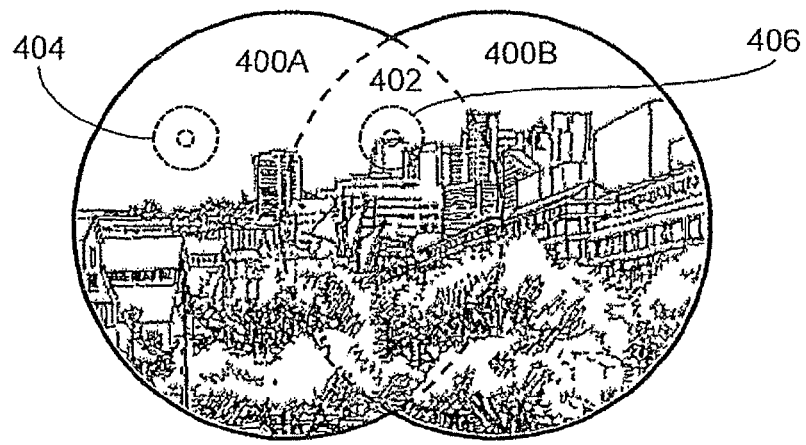
FIG. 4B is an illustration of the combined view seen by a user when looking at a scene in the distance.

Referring to FIG. 4A is an illustration of the offset view seen by each eye of a user when looking through a common area on a display to a point of interest in the distance. View 400A is the view seen by the right eye of the user, and shows that the point of interest shifts to the left of the user's view. View 400B is the view seen by the left eye of the user, and shows that the point of interest shifts to the right of the user's view. Referring to FIG. 4B is an illustration of the combined view seen by a user when looking at a scene in the distance. When a user views a scene, the views are combined in the brain to produce a single consistent picture. The overlap in the middle of the view, designated as 402, is the area where the two views overlap and is known as the binocular portion. Referring also to FIG. 3B, if the display 302 displays a single visible indicator, such as glyph 406, in the common area of the display through which the eyes are looking 310 aligned for the view of the left eye 400B, the visible indicator will be aligned with the view of only the left eye. In the resulting combined view the glyph will be perceived by the right eye in the wrong position 404,—the glyph will not be aligned with the corresponding point of interest.

Figure 4C:
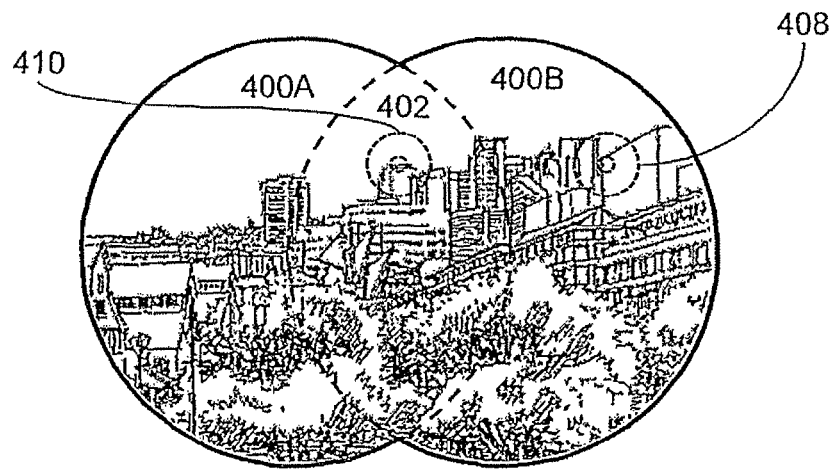
FIG. 4C is a second illustration of the combined view seen by a user when looking at a scene in the distance.

Referring to FIG. 4C is a second illustration of the combined view seen by a user when looking at a scene in the distance. If the display 302 displays a single visible indicator, such as glyph 410, in the common area of the display through which the eyes are looking 310 aligned for the view of the right eye 400A, the visible indicator will be aligned with the view of only the right eye. In the resulting combined view, the glyph will be perceived by the left eye in the wrong position 408—the glyph will not be aligned with the corresponding point of interest.

One solution to the problem of displaying visible indicators aligned with a corresponding point of interest is to display two visible indication portions, where each indication portion is aligned with the viewing direction of one eye. When these indication portions are displayed on a common area and the user looks through the common area at a point of interest, the perceived view of the user will combine the visible indication portions in the binocular portion of the view to create a visible indicator aligned with the point of interest.

Figure 5A:
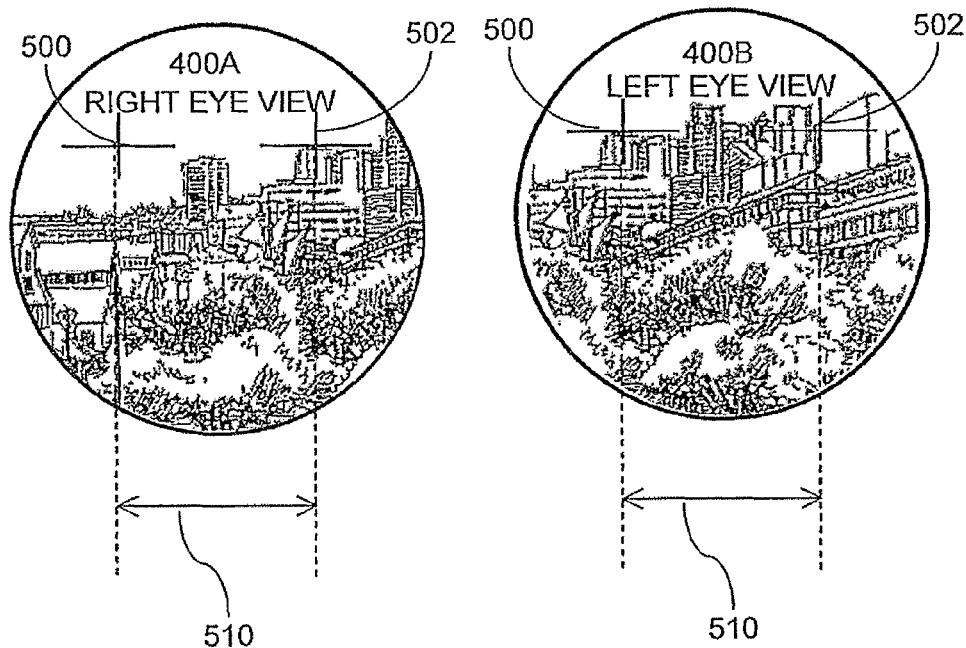
FIG. 5A is an illustration of the view seen by each eye of a user when viewing a point of interest in the distance through a common area on a display.
Figure 5B:
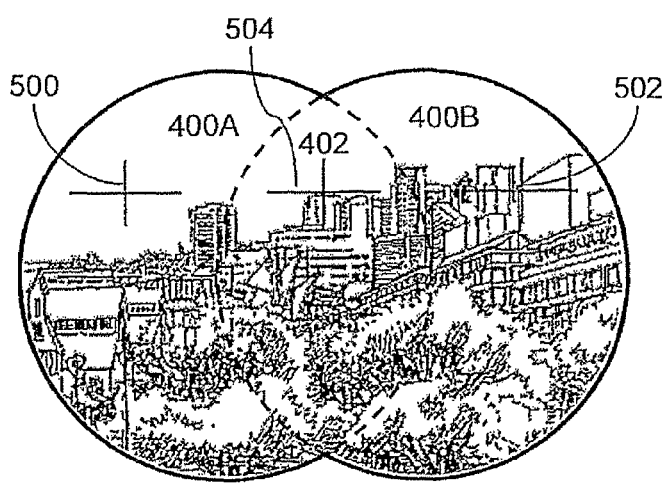
FIG. 5B is an illustration of the combined view with visible indication portions as seen by a user when looking at a scene in the distance.

Referring to FIG. 5A is an illustration of the view seen by each eye of a user when viewing a point of interest in the distance through a common area on a display. View 400A is the view seen by the right eye of the user and view 400B is the view seen by the left eye of the user. In this implementation, the visible indication location is determined. Two visible indication portions 500 and 502 are displayed at the visible indication location, and each eye sees both visible indications. The background that only the right eye sees appears to be shifted to the left, and similarly the background that only the left eye sees appears to be shifted to the right. In one implementation of this method, the required distance 510 on the display between the two visible indication portions 500 and 502, to produce the effect illustrated in FIG. 5B, an illustration of the combined view with visible indication portions as seen by a user when looking at a scene in the distance. The distance 510 is calculated so that when visible indication portions 500 and 502 are displayed on a common area of a display and a user looks through the common area at a point of interest, the perceived view of the user will combine the visible indication portions in the binocular portion of the view to create a visible indicator 504 aligned with the point of interest. Visible indication portion 500 as seen by the left eye and visible indication portion 502 as seen by the right eye are combined in the binocular portion 402 to produce the strong visible indicator 504. Visible indication portion 502 as seen by the left eye and visible indication portion 500 as seen by the right eye are not combined and result in faint visible indication portions.

Figure 6A:
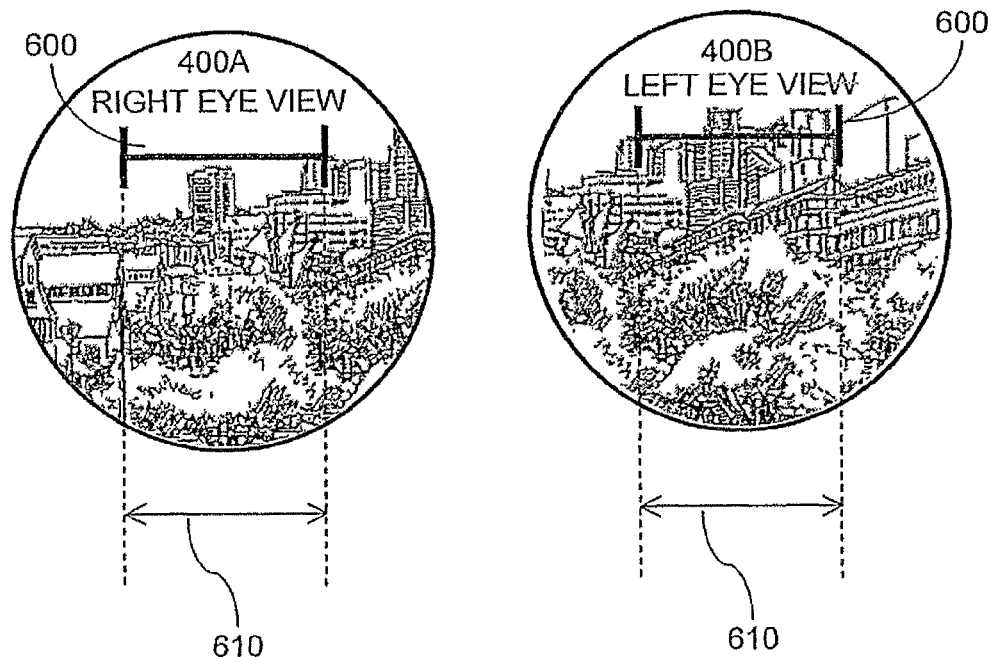
FIG. 6A is an illustration of an alternate visible indication.

Referring to FIG. 6A is an illustration of an alternate visible indicator. View 400A is the view seen by the right eye of the user and view 400B is the view seen by the left eye of the user. In this implementation, the visible indication is a horizontal I-beam glyph. The visible indication location is determined and one visible indication portion 600 is displayed at the visible indication location and is seen by both eyes. The background that only the right eye sees appears to be shifted to the left, and similarly the background that only the left eye sees appears to be shifted to the right.

Figure 6B:
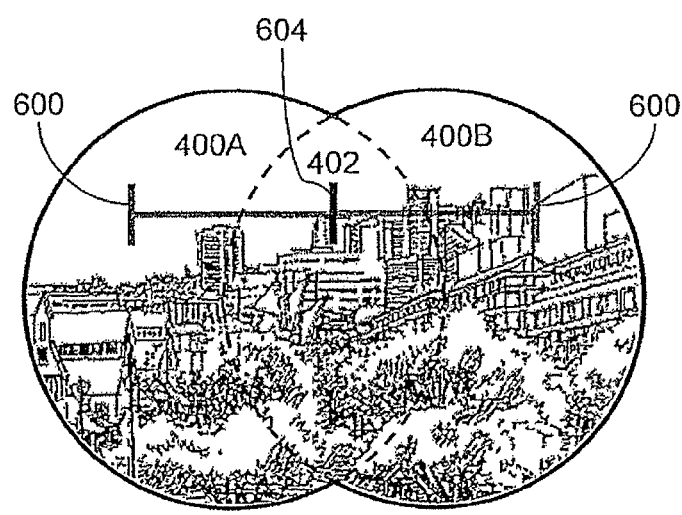
FIG. 6B is an illustration of the combined view of an alternate visible indicator with visible indication portions as seen by a user when looking at a scene in the distance.

In one implementation of this method, the required length 610 between the two vertical ends of the I-beam glyph 600 on the display is calculated, to produce the effect illustrated in FIG. 6B, an illustration of the combined view of an alternate visible indicator with visible indication portions as seen by a user when looking at a scene in the distance. The distance 610 is calculated so that when visible indication portion 600 is displayed on a common area of a display and a user looks through the common area at a point of interest, the perceived view of the user will combine the visible indication portion in the binocular portion of the view to create a strong visible indicator 604 aligned with the point of interest. Most of the visible indication portion 600 as seen by the left eye and visible indication portion 600 as seen by the right eye are not combined and result in a faint visible indication.

Figure 7A:
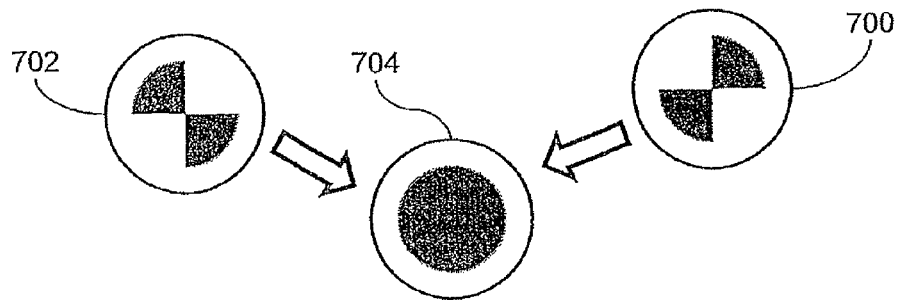
FIG. 7A is an illustration of how partial visible indicators can be combined to provide a visible indication.

Referring to FIG. 7A is an illustration of how partial visible indication portions can be combined to provide a visible indicator. When partial visible indicator 700 is displayed appropriately for one eye and partial visible indicator 702 is displayed appropriately for the other eye, the brain will combine the two partial glyphs in the binocular portion resulting in the perception of glyph 704.

Figure 7B:
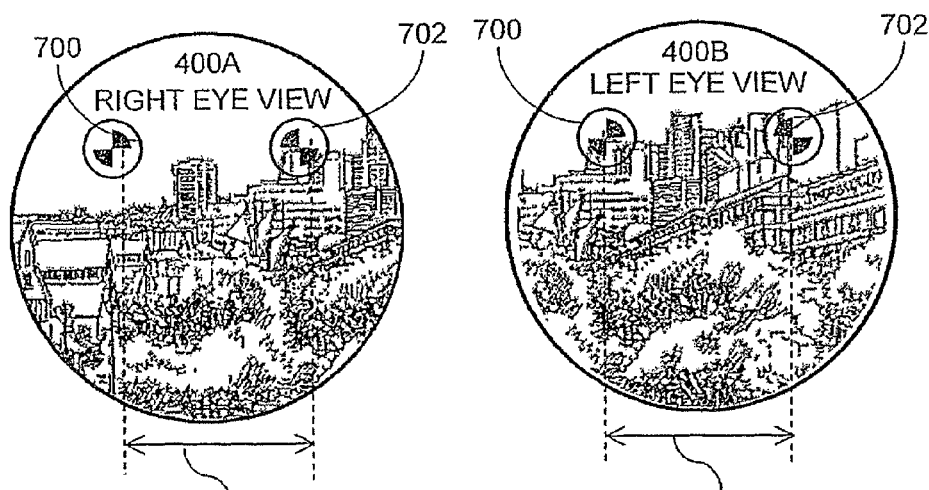
FIG. 7B is an illustration of an alternate visible indication using partial visible indicators to provide the visible indication.
Figure 7C:
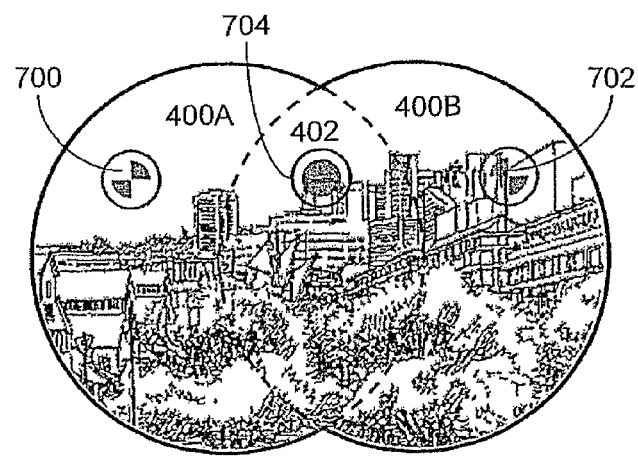
FIG. 7C is an illustration of the combined view seen by a user when each eye looks through the corresponding visible indication locations at a scene.

Referring to FIG. 7B is an illustration of an alternate visible indicator using partial visible indication portions to provide a combined visible indicator. View 400A is the view seen by the right eye of the user and view 400B is the view seen by the left eye of the user. In this implementation, the visible indication location is determined. Two visible indication portions 700 and 702 are displayed at the visible indication location, and each eye sees both visible indications. The background that only the right eye sees appears to be shifted to the left, and similarly the background that only the left eye sees appears to be shifted to the right. In one implementation of this method, the required distance 710 on the display between the two visible indication portions 700 and 702, to produce the effect illustrated in FIG. 7C, an illustration of the combined view of an alternate visible indicator as seen by a user when looking at a scene in the distance. The distance 710 is calculated so that when visible indication portions 700 and 702 are displayed on a common area of a display and a user looks through the common area at a point of interest, the perceived view of the user will combine the visible indication portions in the binocular portion of the view to create a visible indicator 704 aligned with the point of interest. Visible indication portion 700 as seen by the left eye and visible indication portion 702 as seen by the right eye are combined in the binocular portion 402 to produce the strong visible indicator 704. Visible indication portion 702 as seen by the left eye and visible indication portion 700 as seen by the right eye are not combined and result in faint visible indication portions.

The above-described method is highly effective. However, in certain cases it may be preferable to create a visible indicator that indicates only the object of interest, without the faint visible indicators in the perceived view of the user. As described in the above implementation, two visible indications are horizontally aligned using the user's apparent binocular displacement to create a strong visible indicator that indicates the object of interest. The innovative method described above can be used in a further innovative implementation, wherein a displacement is calculated for a single visible indication resulting in the user perceiving a visible indicator for the object of interest and without other faint visible indicators in the perceived view.

Figure 13:
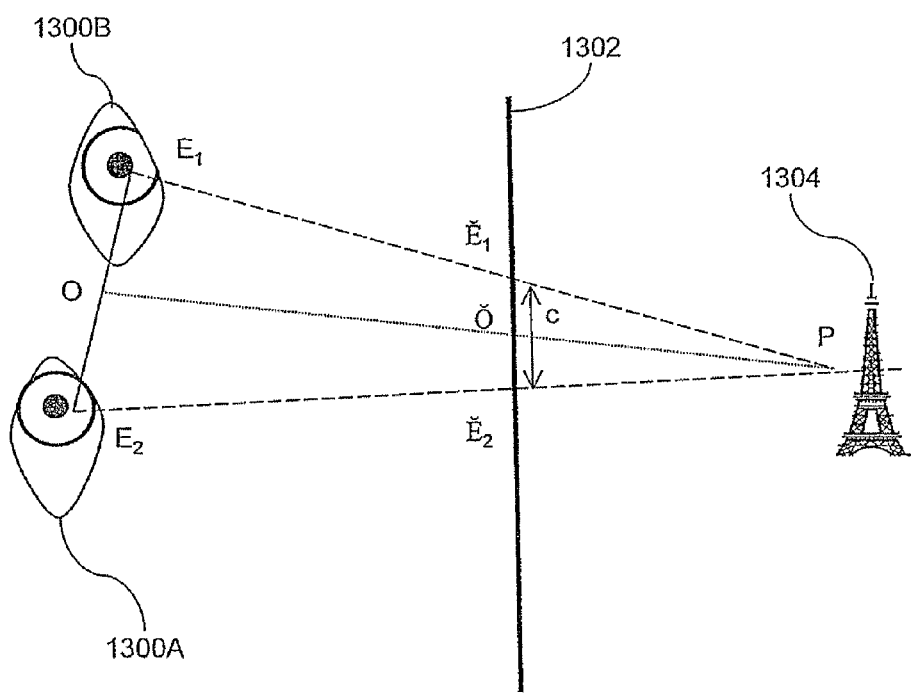
FIG. 13 is a geometrical diagram from above a display, showing a view of a user from the user's eyes through the display to a point of interest on the other side of the display.

As described above, in regards to FIG. 4B, if a single visible indication is displayed aligned with one eye for the object of interest, the resulting perceived view of the user will include a shifted perception of the visible indication that is not aligned with the object of interest. Referring to FIG. 13 is a geometrical diagram from above a display, showing a view of a user from the user's eyes through the display to a point of interest on the other side of the display. The user is viewing the object of interest binocularly, which in this context refers to the user viewing the object of interest with both eyes. Using both a right eye 1300A and a left eye 1300B a user looks through a display 1302 to a point of interest 1304. In FIG. 13, the display is diagrammed from above looking downward toward the display. Locations in the diagram are designated by the following letters: E1 is the location of the center of the left eye, E2 is the location of the center of the right eye, and P is the location of the object of interest. Locations E1, E2, P, and display 1302 are provided to this method using the optional techniques described above or other techniques as appropriate to the application. Locations E1 and E2 are used to calculate O, the middle of the line connecting the centers of the eyes. The locations of E1, E2, P, and display 1302 are known, therefore the intersecting points Ĕ1, Ĕ2, and Ŏ with display 1302 can be calculated. Ŏ is the intersection of the line connecting O and P with display 1302. The single visible indication is centered at location Ŏ with a horizontal displacement c that can be calculated, as will be described.

Figure 15A:
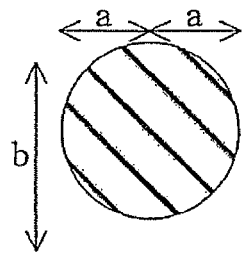
FIG. 15A is a diagram of a round shaded visible indication.
Figure 15B:
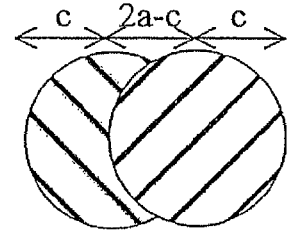
FIG. 15B is a diagram of the perceived visible indicator resulting from using the visible indication in FIG. 15A.

Referring to FIG. 15A, a diagram of a round shaded visible indication, the dimensions are designated with the letter a for half of the width and the letter b for the height of the visible indication. Referring to FIG. 15B, a diagram of the perceived visible indicator resulting from using the visible indication in FIG. 15A, the apparent binocular displacement of the visible indication is the horizontal displacement designated with the letter c. The displacement c can be calculated from the provided information as c=|Ĕ1Ĕ2|.

Figure 14:
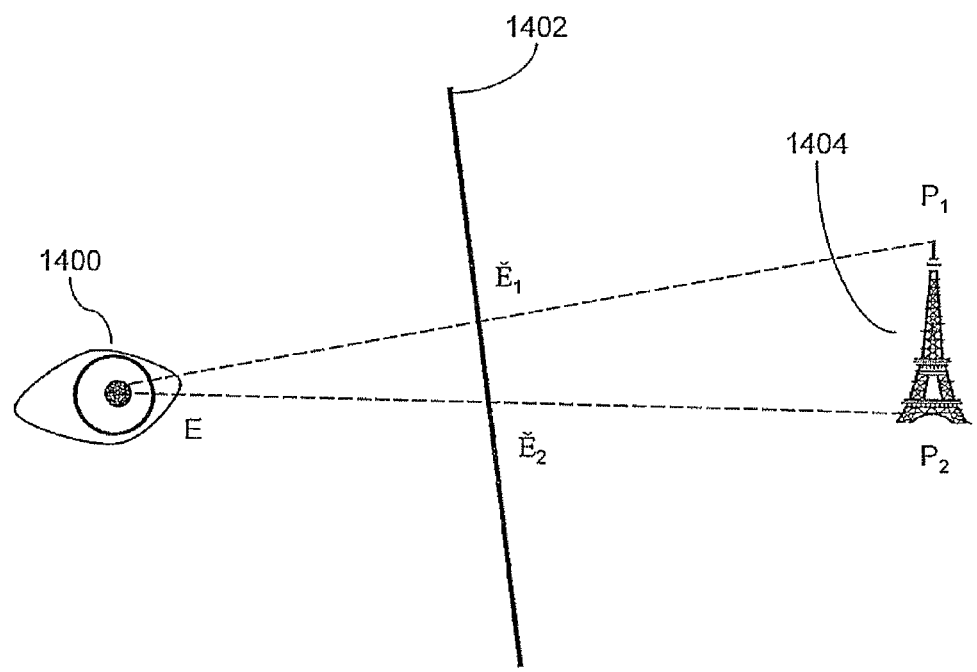
FIG. 14 is a geometrical diagram of a vertical view of a user from the user's eyes through a display to an object of interest on the other side of the display.

Referring to FIG. 14 is a geometrical diagram of a vertical view of a user from the user's eyes through a display to an object of interest on the other side of the display. The eye 1400 represents the vertical center of the eyes as a user looks through a display 1402 to a point of interest 1404. In FIG. 14, the display is diagrammed from the side looking toward the display. Locations in the diagram are designated by the following letters: E is the vertical center of the eyes. P1 is the location of the top of the object of interest and P2 is the location of the bottom of the object of interest. As describe in regards to FIG. 13, the locations are provided, and locations Ĕ1 and Ĕ2 can be calculated. Referring also to FIG. 15A, the resulting height b of the visible indication, and hence the height of the visible indicator can be calculated as b=|Ĕ1Ĕ2|. The overlap of the visible indications can be calculated as 2a–c.

Note that references to horizontal and vertical are relative to the line between the eyes, for example as shown in FIG. 13 as E1 to E2. As the head of the user tilts, the horizontal calculations, such as displacement, also are calculated appropriately to be parallel to the line between the eyes. Similarly, as the head of the user tilts, the vertical calculations, such as the height of the visible indication, also are calculated appropriately to be perpendicular to the line between the eyes. In this context, the width of the visible indication refers to the maximum horizontal extent of the visible indication, and the height of the visible indication refers to the maximum vertical extent of the visible indication.

In one implementation, this method varies dynamically a visible indication on a single non-collimated display, the display providing a spatially aligned head-up display, such that a user looking binocularly through the display at an object of interest perceives a visible indicator that indicates the object of interest by first calculating the user's apparent binocular displacement on the display relative to the object of interest. The calculated displacement is a geometrical relationship that depends on a distance from the user's eyes to the display, an angle from the user's eyes to the display, and a distance from the user to the object of interest. Note that this is a geometrical relationship, so other locations and distances can be used for the calculations, or used as desired to calculate the necessary parameters. According to one non-limiting example, if the distance from the user to the display can be provided, then the distance from the display to the object of interest can be used instead of the distance from the user to the object of interest. Equivalent expressions will be obvious to one skilled in the art. The calculated apparent binocular displacement is used to vary dynamically the width of the visible indication to provide the desired visible indicator.

The calculated displacement c can be used in combination with the shape and width of a visible indication to provide a variety of visible indicators that indicate the object of interest in the overlap area (the area 2a–c). Non-limiting examples of changing the visible indication to affect the perceived visible indicator include changing the width, changing the shape, scaling, or a combination of these and other changes to the visible indication. Note the changes to the visible indication can be continuous or stepped. A non-limiting example of stepped changes is using a visible indication of a first given size when the user is within a first given range of distances from the display. When the user moves out of the first given range into a second given range of distances from the display, a visible indication of a second given size is used.

The visible indication may be a single glyph or a collection of glyphs, where the collection is handled as a single unit for determining the desired width of the visible indication. In one non-limiting example instead of using a single "I-beam" glyph for the visible indication, the visible indication is constructed from two "T" shaped glyphs placed vertically bottom-to-bottom. In this example, the two glyphs create substantially the same shape as a single I-beam glyph. Other options are possible depending on the specific application and will be obvious to one skilled in the art.

Figure 15C:
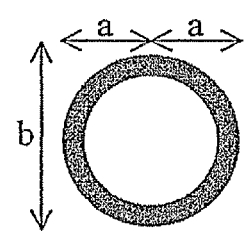
FIG. 15C is a diagram of a circular visible indication.
Figure 15D:
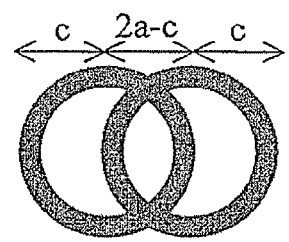
FIG. 15D is a diagram of the perceived visible indicator resulting from using the visible indication in FIG. 15C.

Referring to FIG. 15C, a diagram of a circular visible indication, the resulting displacement and overlap is shown in FIG. 15D, a diagram of the perceived visible indicator resulting from using the visible indication in FIG. 15C. The transparent area within the visible indication is used in the resulting visible indicator to indicate the object of interest. In another implementation, the visible indication is displayed such that in the user's perceived view the object of interest is framed by the visible indicator. In this context, framing the object of interest refers to providing a user a visual impression of surrounding the object of interest, even if the visible indication surrounds only a portion of the object of interest.

Figure 15E:
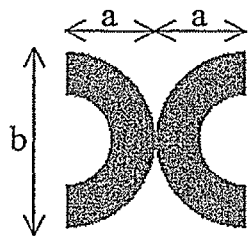
FIG. 15E is a diagram of a visible indication.
Figure 15F:
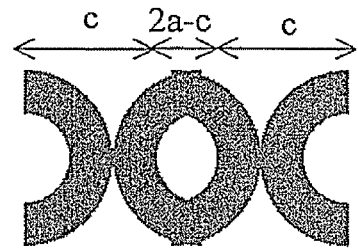
FIG. 15F is a diagram of the perceived visible indicator resulting from using the visible indication in FIG. 15E.

As the distance from the user to the display and to the object of interest change, the percentage of overlap will vary. A variation in the percentage of overlap is acceptable in the perceived view of the user, as long as the variation is small, or stated alternatively, the percentage of overlap is maintained within given limits. Referring to FIG. 15E, a diagram of a visible indication, the resulting displacement and overlap is shown in FIG. 15F, a diagram of the perceived visible indicator resulting from using the visible indication in FIG. 15E. The shape of the visible indication in FIG. 15E is used to create an overlap in the visible indicator of FIG. 15F. The shape of the visible indication can be designed so that when it is juxtaposed in the combined view, the resulting visible indicator provides the desired indication.

Figure 15G:
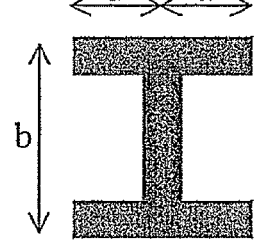
FIG. 15G is a diagram of using a single I-beam shaped visible indication to indicate an object of interest.

In another implementation, visible indication is displayed such that in the user's perceived view the proportion of horizontal overlap is substantially maintained in the visible indicator. In this context, the overlap refers to how much of the width of the visible indication appears coextensive in the perceived visible indicator. The proportion of horizontal overlap is given by $(2a-c)/2a$ and the range depends on the visible indication used and the desired visible indicator. Referring to FIGS. 15A and 15C, maintaining the percentage of overlap in the range of 5% to 70% will substantially produce visible indicators 15B and 15D, respectively. Preferably, a range of 20% to 50% should be used to produce visible indicators such as shown in 15B and 15D. Referring to FIGS. 15E and 15G, maintaining the percentage of overlap in the range of −10% to 10% will substantially produce visible indicators 15F and 15H, respectively. These are non-limiting examples and other possibilities depend on the specific application.

In another implementation, the height of the visible indication is varied dynamically based on at least a distance from the user to the object of interest such that the perceived height (angular height) of the visible indicator relative to the object of interest is substantially maintained. Given a distance from a user to an object of interest and a distance from the user to a display, the required height of the visible indication can be calculated, and the visible indication can be displayed appropriately. As the ratio of the distance from the user to the object of interest to the distance from the user to the display changes, the visible indication can be updated appropriately. Stated another way, in the resulting user view, as the distance between the user and the object of interest changes, the object of interest will appear larger or smaller, and the visible indicator will change accordingly to appear larger or smaller.

In another implementation, the height of the visible indication is varied dynamically based on at least a distance from the user to the display such that the perceived height (angular height) of the visible indicator relative to the user is substantially maintained. Stated another way, in the resulting user view, the change in the size of the visible indicator does not correspond to the distance from the user to the object of interest, rather as the distance between the user and the display changes the visible indicator will change accordingly to maintain a given size in relation to the user view. According to a non-limiting example, the height and line-thickness of the visible indication changes to maintain the size of the visible indicator as perceived by the user.

It will be noted that the various implementations described above with reference to FIGS. 5A-7C may be regarded as a special case of the visible indication defined here, in which a first visible indication portion displayed in a first position aligned with the viewing direction from a first eye of the user to the point of interest in the scene and a second visible indication portion displayed in a second position aligned with the viewing direction from a second eye of the user to the point of interest in the scene such that the first visible indication portion and the second visible indication portion combine in the perceived view of the user to indicate the point of interest.

Figure 10A:
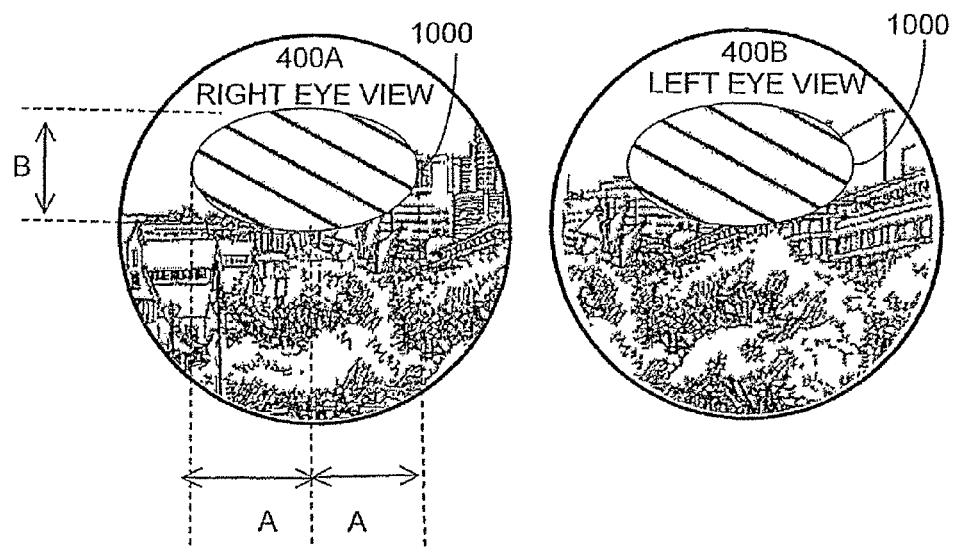
FIG. 10A is an illustration of using a single visible indication to indicate an object of interest.
Figure 10B:
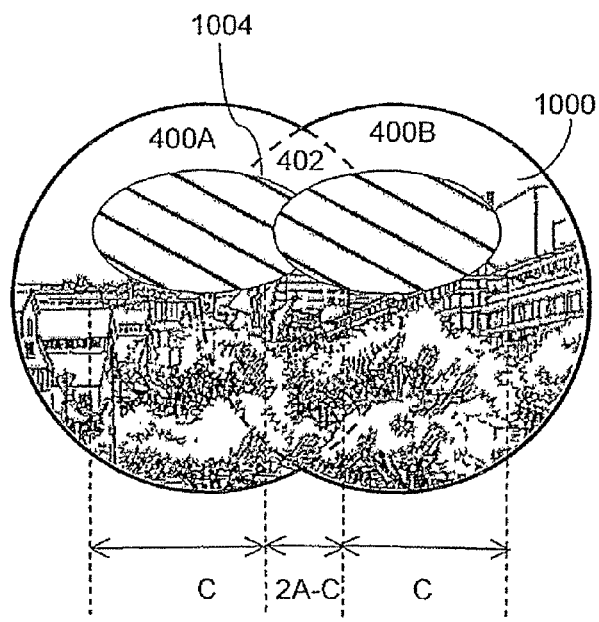
FIG. 10B is an illustration of the perceived visible indicator of FIG. 10A.

Referring to FIG. 10A is an illustration of using a single visible indication to indicate an object of interest. This round shaded single visible indication is also described with dimensions in reference to FIGS. 15A and 15B. View 400A is the view seen by the right eye of the user and view 400B is the view seen by the left eye of the user. In this implementation, the visible indication 1000 is a semi-transparent glyph corresponding to the point of interest. Visible indication 1000 is displayed in the visible indication location on the display and displaced to produce the visible indicator shown in FIG. 10B, an illustration of the perceived visible indicator of FIG. 10A. The displaced perceptions of visible indication 1000 is combined in the binocular portion 402 to produce a shaded (less transparent) visible indication 1004.

Figure 11A:
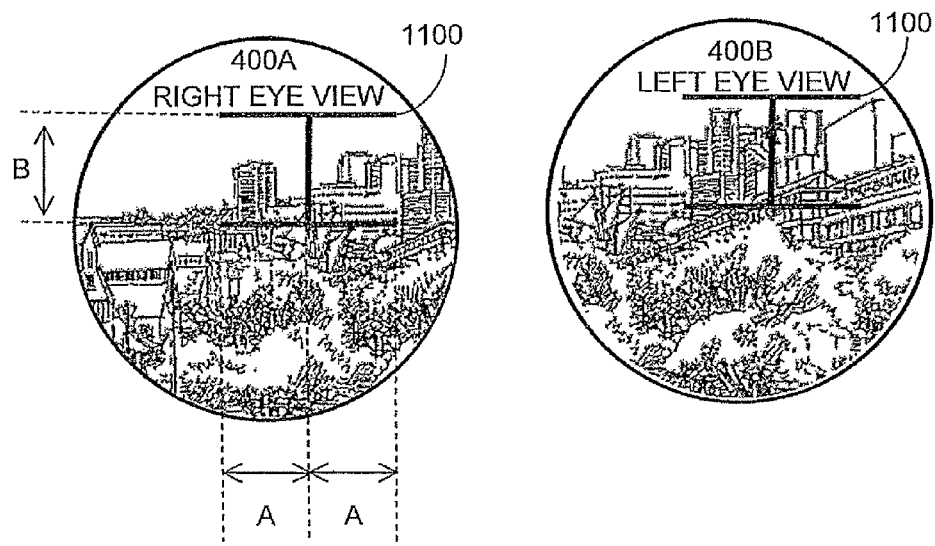
FIG. 11A is an illustration of using a single visible indication to indicate an object of interest.
Figure 11B:
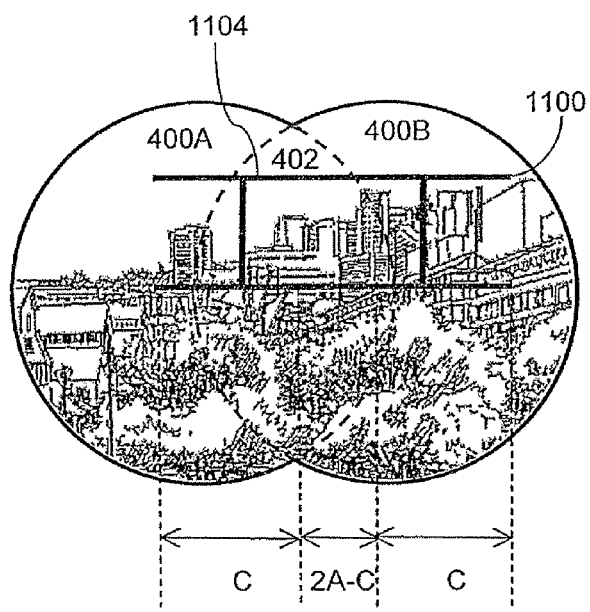
FIG. 11B, an illustration of the perceived visible indicator of FIG. 11A.
Figure 15H:
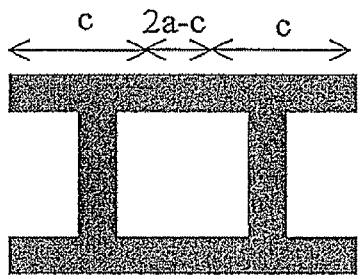
FIG. 15H is a diagram of the perceived visible indicator resulting from using the visible indication in FIG. 15G.

Referring to FIG. 11A is an illustration of using a single visible indication to indicate an object of interest. This single visible indication is also described with dimensions in reference to FIGS. 15G and 15H. View 400A is the view seen by the right eye of the user and view 400E is the view seen by the left eye of the user. In this implementation, the visible indication 1100 is vertical I-beam glyph, with the edge of the glyph corresponding to the object of interest. Visible indication 1100 is displayed in the visible indication location on the display and displaced to produce the visible indicator shown in FIG. 11B, an illustration of the perceived visible indicator of FIG. 11A. The displaced perceptions of visible indication 1100 are combined in the binocular portion 402 to produce a framing visible indicator 1104.

The illustrations of FIGS. 15E and 15F and FIGS. 15G and 15H showing the use of partial visible indications to provide a visible indicator are non-limiting examples, and this method is applicable to a variety of glyphs depending on the application in which it is used.

In an optional implementation, there is a plurality of users. Processing determines a position and attitude of a plurality of faces of the users. The display associated with each user displays visible indications in a corresponding plurality of positions relative to the display. Each of the visible indications is aligned with the viewing direction for the eyes of a corresponding user's face. In an optional implementation, the number of visible indications displayed is dynamically varied according to the number of faces currently detected.

In another optional implementation, a display is associated with a window of a terrestrial vehicle. Optionally geographical position information for the vehicle is provided, shown by block 218. Optionally a geographical database, shown by block 220, is also provided. Geographical position information for the vehicle is used to retrieve from the geographical database location information for the points of interest. This location information is used to determine the visible indicator portion, 214. Note that other connections are possible, such as providing the geographical position 218 directly to the geographical database 220. Other connection options will be obvious to one skilled in the art.

In an optional implementation, based on the current position and attitude of the user's face, a subset of points of interest from the geographical database currently visible to the user can be determined.

In an optional implementation, a viewing direction from a user to a radiation point that the user needs to be shaded from is determined. A visible indication location is calculated to find where the viewing direction from the user intercepts the shading system. The shading system is actuated to provide shade aligned with the viewing direction.

In an optional implementation, a method for employing a non-collimated transparent display to designate an object viewed by a user binocularly through the display, the method includes: displaying a first visible indication portion in a first position on the display, the first position being aligned between a first eye of the user and the object; and displaying a second visible indication portion in a second position on the display, the second position being aligned between a second eye of the user and the object.

One implementation of a system for providing a spatially aligned head-up display to a plurality of users viewing scenes through one or more displays includes a detection system for determining a position and attitude of each of the user's faces. Referring to FIG. 1, the image sensing system 102 can be replaced with a conventional detection system. Examples of conventional detection systems are described in the background section of this document. Conventional use of these systems is for detection of a single person. One or more detection systems can provide the position and attitude of a plurality of user's faces. The position and attitude information is sent to a control system for processing. Optionally, data from the detection system is sent to the control system, and the control system processes the data from to determine a position and attitude of each of the user's faces. Other combinations and options will be obvious to one skilled in the art. The control system determines a viewing direction from at least one eye of each of the users to an associated point of interest within the corresponding scene. Each user can be looking at a different scene, with different points of interest. An example is passengers on a tour bus, where each passenger is looking out of the side window of the bus at a different point of interest in the scene on that side of the bus. One or more displays are used to display visible indications to the users superimposed on the scene. One example is where each pair of seats on a side of a tour bus has a corresponding display associated with the window for the pair of users, and visible indications are displayed for each of the pair of users. Another example is a plurality of users looking through a display associated with a picture window overlooking a scene and a plurality of visible indications are displayed on the display. Each visible indication is aligned with each of the viewing directions for each corresponding user and provides each user with a spatially aligned head-up display.

It will be appreciated that the above descriptions are intended only to serve as examples, and that many other embodiments are possible within the scope of the present invention as defined in the appended claims.

What is claimed is:

1. A method for varying dynamically a visible indication on a single non-collimated display, said display providing a spatially aligned head-up display, such that a user looking binocularly through said display at an object of interest perceives a visible indicator that indicates the object of interest, the method comprising the steps of:
   (a) calculating the user's apparent binocular displacement on said display relative to the object of interest; and
   (b) varying dynamically, based on said apparent binocular displacement, the width of said visible indication.

2. The method of claim 1, wherein the height of said visible indication is varied dynamically based at least on a distance from the user to the object of interest such that the perceived height of said visible indicator relative to the object of interest is substantially maintained.

3. The method of claim 1, wherein the height of said visible indication is varied dynamically based on at least a distance from the user to said display such that the perceived height of said visible indicator relative to the user is substantially maintained.

4. The method of claim 1, wherein said visible indication is displayed such that, in the user's perceived binocular view, the object of interest is framed by the visible indicator.

5. The method of claim 1, wherein said visible indication is displayed such that in the user's perceived view a proportion of horizontal overlap of said visible indication with itself due to the apparent binocular displacement is maintained substantially constant.

6. The method of claim 1, wherein said visible indication includes a first visible indication portion displayed in a first position aligned with said viewing direction from a first eye of the user to the point of interest in the scene and a second visible indication portion displayed in a second position aligned with said viewing direction from a second eye of the user to the point of interest in the scene such that said first visible indication portion and said second visible indication portion combine in the perceived view of the user to indicate the point of interest.

7. A system for providing a spatially aligned head-up display to a user viewing a scene through a display the system comprising:
   (a) an image sensing system including at least one image sensor deployed to sample images of the user's face, said image sensing system generating data derived at least in part from said images;
   (b) a display for displaying visible indications to the user superimposed on the scene; and
   (c) a control system associated with said image sensing system and said display, said control system including at least one processor, said control system being configured to:
      (i) process data from said image sensing system to determine a position and attitude of the user's face,
      (ii) determine a viewing direction from at least one eye of the user to a point of interest within the scene, and
      (iii) actuate said display to display a visible indication aligned with said viewing direction that provides a spatially aligned head-up display to the user,
   wherein said display is a single non-collimated display, said display providing a spatially aligned head-up display, such that a user looking binocularly through said display at an object of interest perceives a visible indicator that indicates the object of interest, said control system is additionally configured to vary dynamically said visible indication by:
      (iv) calculating the user's apparent binocular displacement on said display relative to the object of interest; and
      (v) varying dynamically, based on said apparent binocular displacement, the width of said visible indication.

8. A method for providing a spatially aligned head-up display to a user viewing a scene through a display, the method comprising the steps of:
   (a) sampling images of the user's face;
   (b) processing said images to determine a position and attitude of the user's face;
   (c) determining a viewing direction from at least one eye of the user to a point of interest within the scene; and
   (d) displaying on a display a visible indication aligned with said viewing direction that provides a spatially aligned head-up display to the user,
   wherein said visible indication is varied dynamically on a single non-collimated display, said display providing a spatially aligned head-up display, such that a user looking binocularly through said display at an object of interest perceives a visible indicator that indicates the object of interest, the method further comprising the steps of:
(e) calculating the user's apparent binocular displacement on said display relative to the object of interest; and
(f) varying dynamically, based on said apparent binocular displacement, the width of said visible indication.

* * * * *